United States Patent
Bieringer et al.

(10) Patent No.: US 10,483,879 B2
(45) Date of Patent: Nov. 19, 2019

(54) ON-LOAD TAP CHANGER AND METHOD OF AND SYSTEM FOR OPERATING SAME

(71) Applicant: MASCHINENFABRIK REINHAUSEN GMBH, Regensburg (DE)

(72) Inventors: Alfred Bieringer, Geiselhoering (DE); Christian Hammer, Regensburg (DE); Christian Hurm, Deuerling (DE); Andreas Sachsenhauser, Mallersdorf-Pfaffenberg (DE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 0 days.

(21) Appl. No.: 15/560,436

(22) PCT Filed: Apr. 13, 2016

(86) PCT No.: PCT/EP2016/058119
§ 371 (c)(1),
(2) Date: Sep. 23, 2017

(87) PCT Pub. No.: WO2016/169826
PCT Pub. Date: Oct. 27, 2016

(65) Prior Publication Data
US 2018/0069492 A1    Mar. 8, 2018

(30) Foreign Application Priority Data
Apr. 22, 2015   (DE) .................. 10 2015 106 178

(51) Int. Cl.
*H01H 9/00*   (2006.01)
*H02P 1/12*   (2006.01)
(Continued)

(52) U.S. Cl.
CPC .............. *H02P 1/12* (2013.01); *H01F 29/04* (2013.01); *H01H 9/0005* (2013.01); *H02K 3/04* (2013.01); *H01H 33/6647* (2013.01)

(58) Field of Classification Search
CPC ..... H01H 9/005; H01H 9/0016; H01H 9/0027
See application file for complete search history.

(56) References Cited

U.S. PATENT DOCUMENTS 6,060,669 A * 5/2000 Dohnal ................ H01H 9/0033
200/11 TC
6,091,032 A   7/2000 Dohnal et al.
(Continued)

FOREIGN PATENT DOCUMENTS

DE          2242318 A1   3/1973
DE    102009048813 A    4/2011
(Continued)

*Primary Examiner* — Fritz M Fleming
(74) *Attorney, Agent, or Firm* — Andrew Wilford (57) ABSTRACT

A load stepping switch (1) for uninterrupted changeover between winding taps (n, n+1) on a control winding (20) comprises —a changeover switch (2) that comprises a first, second and third changeover contact (2.1, 2.2, 2.3) and can adopt a first position, in which the first and third changeover contacts are connected, a second position, in which the second and third changeover contacts are connected, and a bridge position, in which the changeover contacts are connected; —a first fixed contact (4) that can be connected to a first winding tap; —a second fixed contact (5) that can be connected to a second winding tap; —a first moving contact (6) that can optionally make contact with each of the fixed contacts; —a second moving contact (7) that can optionally make contact with each of the fixed contacts; —a main path (8) that connects the first moving contact to the first changeover contact; —an auxiliary path (9) that connects the second moving contact to the second changeover contact via a current-limiting element (10); —a switching element (11)
(Continued)

that is connected between the main path and the second changeover contact.

13 Claims, 4 Drawing Sheets

(51) Int. Cl.
*H01F 29/04* (2006.01)
*H02K 3/04* (2006.01)
*H01H 33/664* (2006.01)

(56) References Cited

U.S. PATENT DOCUMENTS

| | | |
|---|---|---|
| 8,993,904 B2 | 3/2015 | Elick |
| 9,941,064 B2 | 4/2018 | Hammer et al. |
| 2014/0167529 A1 | 6/2014 | Teising et al. |

FOREIGN PATENT DOCUMENTS

| | | |
|---|---|---|
| DE | 102009048813 A1 | 4/2011 |
| GB | 1114868 A | 5/1968 |

\* cited by examiner

ON-LOAD TAP CHANGER AND METHOD OF AND SYSTEM FOR OPERATING SAME

CROSS REFERENCE TO RELATED APPLICATIONS

This application is the US-national stage of PCT application PCT/EP2016/058119 filed 13 Apr. 2016 and claiming the priority of German patent application 102015106178.3 itself filed 22 Apr. 2015.

FIELD OF THE INVENTION

The invention relates to an on-load tap changer for uninterrupted switching between winding taps of a control winding, to a method of actuating an on-load tap changer and to an electrical system with a control winding and an on-load tap changer.

BACKGROUND OF THE INVENTION

DE 10 2009 048 813 describes a tap changer for uninterrupted switching between winding taps of a tapped transformer. The tap changer has two load branches each comprising a vacuum interrupter acting as a main contact and parallel thereto a series circuit of a switching-over resistance and a vacuum interrupter. The winding taps can be connected with a common load output line by the load branches. Mechanical switching elements serving as additional isolating switches are arranged between the vacuum interrupters of the two load branches and the load output line. It is possible by the mechanical switching elements to electrically separate the respective interrupter from the load output line in a load branch not conducting the load current and thus to increase the surge voltage strength of the tap changer.

SUMMARY OF THE INVENTION

According to a first aspect the invention proposes an on-load tap changer for uninterrupted switching between winding taps of a control winding, comprising:
a changeover switch that has a first changeover contact, a second changeover contact and a third changeover contact and that can assume a first position in which the first and third changeover contacts are connected, a second position in which the second and third changeover contacts are connected and a bridging position in which the changeover contacts are connected;
a first fixed contact that is or can be connected with an associated first winding tap;
a second fixed contact that is or can be connected with an associated second winding tap;
a first movable contact that can selectably contact each of the fixed contacts;
a second movable contact that can selectably contact each of the fixed contacts;
a main branch that connects the first movable contact with the first changeover contact;
an auxiliary branch that connects the second movable contact with the second changeover contact by a current-limiting element; and
a switching element connected between the main branch and the second changeover contact.

Through the two fixed contacts each is connected with an associated winding tap, this on-load tap changer makes it possible for the two movable contacts to simultaneously contact a fixed contact, thus a winding tap. The entire on-load tap changer thus lies at a defined potential and therefore has a high surge voltage strength. Moreover, no voltage-limiting elements such as, for example, varistors are needed.

This on-load tap changer has a high surge voltage strength with few mechanical switching contacts and vacuum interrupters and is thus economic and reliable.

This on-load tap changer can be constructed in any desired mode and manner according to need, for example
as a load selector or in such a way that it has at least one load changeover switch and at least one selector; and/or
in such a way that it has at least one or no additional changeover switch and/or at least one or no additional fixed contact and/or at least one or no additional movable contact and/or at least one or no additional main branch and/or at least one or no additional auxiliary branch and/or at least one or no additional switching element.

The movable contacts can be constructed in any desired mode and manner according to need, for example as contacts that can be moved linearly or rotationally in exactly one plane or in at least one plane. The movable contacts can be constructed as selector contacts of a fine selector.

Preferably it is specified that
the main branch directly connects the first movable contact with the first changeover contact; and/or
the current-limiting element is constructed as a resistor; and/or
the movable contacts are actuatable independently of one another.

Preferably it is specified that
the changeover switch is constructed as a bridging changeover switch and has a movable first middle contact connected with the third changeover contact; and
in the first position the middle contact contacts the first changeover contact, in the second position the middle contact contacts the second changeover contact and in the bridging position the middle contact contacts the first and second changeover contacts.

In that case, the bridging changeover switch can be constructed as a rotary switch in which the movable middle contact is rotated or as a pull switch in which the movable middle contact is pulled or pressed.

Advantageously, the middle contact in the first position does not contact the second changeover contact and in the second position does not contact the first changeover contact.

Preferably it is specified that
the changeover switch has a movable first middle contact connected with the third changeover contact and a movable second middle contact connected with the third changeover contact; and
in the first position the first and/or second middle contact contacts the first changeover contact, in the second position the second and/or first middle contact contacts the second changeover contact and in the bridging position the first middle contact contacts the first changeover contact and the second middle contact contacts the second changeover contact.

The changeover switch with two middle contacts achieves the bridging position in that one of the middle contacts contacts the first changeover contact and the other middle contact contacts the second changeover contact. In a first or second position at least one of the middle contacts has to contact the first or second changeover contact.

Advantageously, the middle contacts in the first position do not contact the second changeover contact and in the second position do not contact the first changeover contact.

Preferably it is specified that the current-limiting element has at least one resistance and/or at least one inductance and/or at least varistor.

It is preferably specified that the switching element is constructed as a vacuum interrupter, an oil switching path or a semiconductor switching element that can be, for example, an IGBT or a thyristor.

For preference it is specified that
each fixed contact has at least two contact surfaces; and
at each fixed contact the first contact surface is associated with the first moved contact and the second contact surface is associated with the second moved contact.

The contact surfaces can be formed in any desired mode and manner and, for example, lie in a common plane or in different planes and/or project in the same direction or in different directions and/or be of single-part or multi-part construction.

It is preferably specified that the third changeover contact is or can be connected with a load output line.

According to a second aspect the invention proposes a method of actuating an on-load tap changer that has at least one first and second movable contact and at least one first and second fixed contact, wherein
switching takes place from a first stationary state in which the movable contacts contact the first fixed contact to a second stationary state in which the movable contacts contact the second fixed contact.

This method makes it possible for the on-load tap changer in the stationary state to lie at a defined potential, since the individual movable contacts contact a fixed contact of a common winding tap.

This method offers a high surge voltage strength with few mechanical switching contacts and vacuum interrupters and is in that case economic and reliable.

The on-load tap changer can be constructed in any desired mode and manner according to need, for example as an on-load tap changer proposed in accordance with the first aspect and/or as part of one of the installations proposed in accordance with the third aspect.

For preference is specified that
the second movable contact is separated from the first fixed contact and is contacted by the second fixed contact;
a load current is switched over from a main branch to an auxiliary branch; and
the first movable contact is separated from the first fixed contact and is contacted by the second fixed contact.

After the two movable contacts have contacted the second fixed contact, the load current can be switched over from the auxiliary branch to the main branch.

It is preferably specified that
the first movable contact is separated from the first fixed contact and is contacted by the second fixed contact;
a load current is switched over from an auxiliary branch to a main branch; and
the second movable contact is separated from the first fixed contact and is contacted by the second fixed contact.

Before the first movable contact is separated from the first fixed contact and is contacted by the second fixed contact the load current can be switched over from the main branch to the auxiliary branch.

For preference it is specified that the switching-over of the load current is carried out by means of a changeover switch and a switching element.

The changeover switch is preferably constructed like the changeover switch in one of the proposed on-load tap changers. The switching element is preferably constructed like the switching element in one of the proposed on-load tap changers.

It is preferably specified that the changeover switch is actuated only when the switching element is closed.

For preference, it is specified that
the changeover switch has a first, second and third changeover contact and can assume a first position in which the first and third changeover contacts are connected, a second position in which the second and third changeover contacts are connected and a bridging position in which the changeover contacts are connected; and
prior to movement of the first movable contact the switching element is opened and the changeover switch assumes the second position or is switched to this position, wherein then, in particular, the load current is switched from the main branch to the auxiliary branch and/or prior to movement of the second movable contact the switching element is opened and the changeover switch assumes the first position or is switched to this position, wherein then, in particular, the load current is switched from the auxiliary branch to the main branch.

Preferably it is specified that
in a step a the switching element is opened or remains or is open and the changeover switch assumes the first position or is switched to this position;
in a step b the second movable contact is separated from the first fixed contact and is contacted by the second fixed contact;
in a step c the switching element is closed and the auxiliary branch connecting the second movable contact with the second changeover contact by a current-limiting element is connected by the switching element with the main branch that connects the first movable contact with the first changeover contact;
in a step d the changeover switch is switched to the bridging position;
in a step e the changeover switch is switched to the second position;
in a step f the switching element is opened and the auxiliary branch is separated from the main branch by the switching element;
in a step g the first movable contact is separated from the first fixed contact and is contacted by the second fixed contact;
in a step h the switching element is closed and the auxiliary branch is connected with the main branch by the switching element;
in a step i the changeover switch is switched to the bridging position; and
in a step j the changeover switch is switched to the first position.

Preferably it is specified that
the switching element is opened in a step k after step j.

According to a third aspect of the invention proposes an electrical installation comprising:
a control winding; and
an on-load tap changer connected with the control winding and is constructed as one of the on-load tap changers proposed in accordance with the first aspect.

This installation has a high surge voltage strength for few mechanical switching contacts and vacuum interrupters and is in that case economic and reliable.

This installation can be constructed in any mode and manner according to need, for example
as a compensation choke for influencing reactive power in an alternating current mains or as a local mains transformer or power transformer or control transformer or phase shift transformer or current rectifying transformer or reactive power compensation installation; and/or in such a way that it has at least one or no additional control winding and/or at least one or no additional on-load tap changer and/or at least one main winding.

One of the proposed methods can be carried out for example, by any of the proposed on-load tap changers and any of the proposed installations.

For preference, each of the proposed on-load tap changers can be constructed in such a way and/or serve the purpose and/or be suitable for such a purpose that it executes and/or can execute one of the proposed methods. For preference, each of the proposed installations can be constructed in such a way and/or serve the purpose and/or be suitable for such a purpose that it executes and/or can execute one of the proposed methods.

The embodiments and explanations with respect to one of the aspects of the invention, particularly with respect to individual features of this aspect, correspondingly also apply in analogous manner to other aspects of the invention.

BRIEF DESCRIPTION OF THE INVENTION

Embodiments of the invention are explained in more detail in the following by way of example on the basis of the accompanying drawings. However, the individual features evident therefrom are not restricted to the individual forms of embodiment, but can be coupled and/or combined with other above-described individual features and/or with individual features of other forms of embodiment. The details in the drawings are to be understood as merely explanatory, but not as limiting. The reference numerals contained in the claims are not to restrict the scope of protection of the invention in any way, but merely refer to the forms of embodiment shown in the drawings.

In the drawings.

SPECIFIC DESCRIPTION OF THE INVENTION

Figure 1:
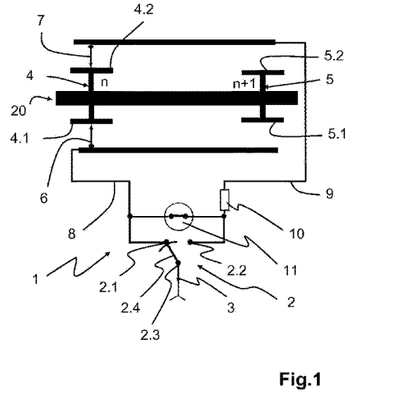
FIG. 1 shows a preferred embodiment of an electrical installation with a preferred embodiment of an on-load tap changer.

A preferred embodiment of an electrical installation is schematically illustrated in FIG. 1 that, by way of example, forms a control transformer and that, by way of example, has a control winding 20 and an on-load tap changer 1 constructed in accordance with a preferred embodiment, for uninterrupted switching between winding taps n, n+1 of the control winding 20. This on-load tap changer 1 has a changeover switch 2 constructed in accordance with a first embodiment, with a first, second and third changeover contact 2.1, 2.2, 2.3 and a movable middle contact 2.4 connected with a load output line 3 of the installation. This changeover switch 2 is constructed as a bridging changeover switch. The changeover switch 2 in a first position contacts the first changeover contact 2.1, in a second position contacts the second changeover contact 2.2 and in a bridging position contacts both changeover contacts 2.1, 2.2. In that case, in the first position this connects the first and third changeover contacts 2.1, 2.3, in the second position connects the second and third changeover contacts 2.2, 2.3 and in the bridging position connects the first, second and third changeover contacts 2.1, 2.2, 2.3.

Two of the fixed contacts 4, 5 are connected with an associated winding tap n, n+1. In that case, the number of fixed contacts depends on the number of winding taps. Each fixed contact 4, 5 has at least two contact surfaces 4.1, 4.2, 5.1, 5.2. In addition, the on-load tap changer 1 has at least two movable contacts 6, 7, each able to selectably contact at least one of the fixed contacts 4, 5. In that case, the first contact surface 4.1, 5.1 is always associated with the first movable contact 6 and the second contact surface 4.2, 5.2 is always associated with the second movable contact 7.

A main branch 8 connects the first movable contact 6 with the first changeover contact 2.1. An auxiliary branch 9 connects the second movable contact 7 with the second changeover contact 2.2 by a current-limiting element 10. In that case, the current-limiting element 10 can be constructed as a resistor, inductance (coil) or varistor. The main branch 8 and the auxiliary branch 9 can be connected together by a switching element 11 connected between the main branch 8 and the second changeover contact 2.2 (between the current-limiting element 10 and the second changeover contact 2.2). The switching element 11 is preferably constructed as a vacuum interrupter.

A preferred embodiment of a switching sequence of the on-load tap changer 1 is described in FIGS. 2a to 2K.

Figure 2A:
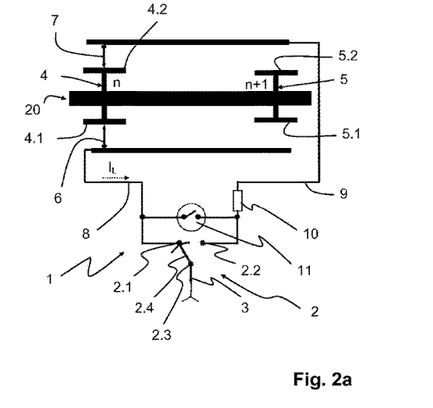
FIGS. 2a-k show a switching sequence in the on-load tap changer.

In a step a the switching element 11 is opened or remains open. In that case, the changeover switch 2 assumes a first position in which the middle contact 2.4 contacts the first changeover contact 2.1 as is illustrated in FIG. 2a. The load current IL here flows from the winding tap n by the main branch 8, thus by fixed contact 4 and the movable contact 6, to the changeover switch 2 and thus to the load output line 3.

Figure 2B:
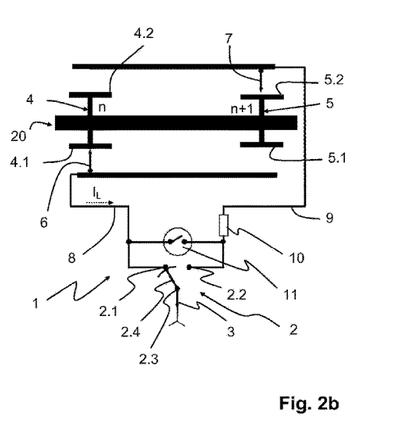

In step b the second movable contact 7 is separated from the first fixed contact 4 until this contacts the second fixed contact 5, as is illustrated in FIG. 2b.

Figure 2C:
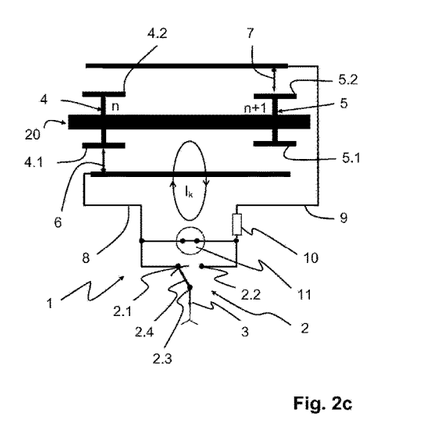

In a step c the switching element 11 is closed and the auxiliary branch 9 that connects the second movable contact 7 with the second changeover contact 2.2 by a current-limiting element 10, is connected with the main branch 8—that connects the first movable contact 6 with the first changeover contact 2.1—by the switching element 11, as is illustrated in FIG. 2c. Since now two different winding taps n and n+1 are electrically conductively connected, a circular current lk limited by the current-limiting element 10, arises.

Figure 2D:
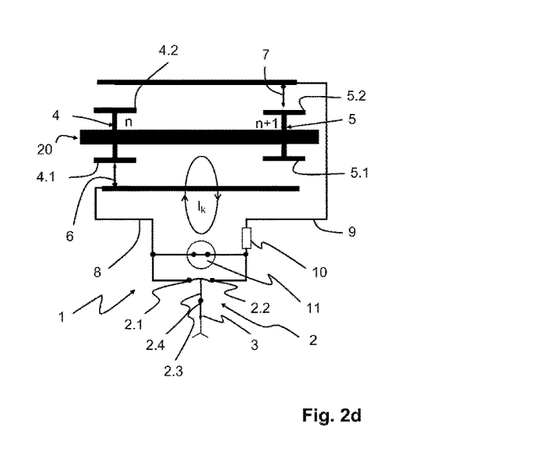

In a step d the changeover switch 2 is switched into a bridging position in which the middle contact 2.3 contacts both changeover contacts 2.1, 2.2, as is illustrated in FIG. 2d.

Figure 2E:
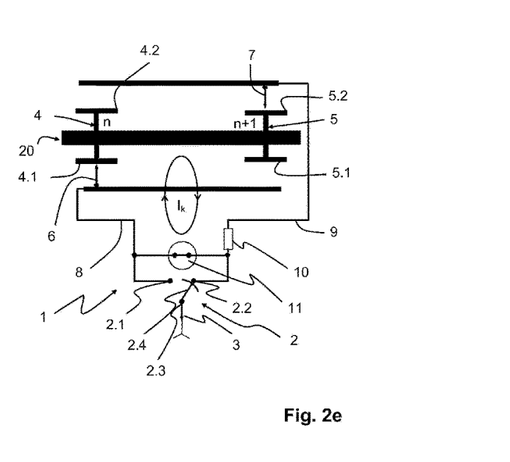

In a step e the changeover switch 2 is switched into a second position in which the middle contact 2.3 contacts the second changeover contact 2.2, as is illustrated in FIG. 2e.

Figure 2F:
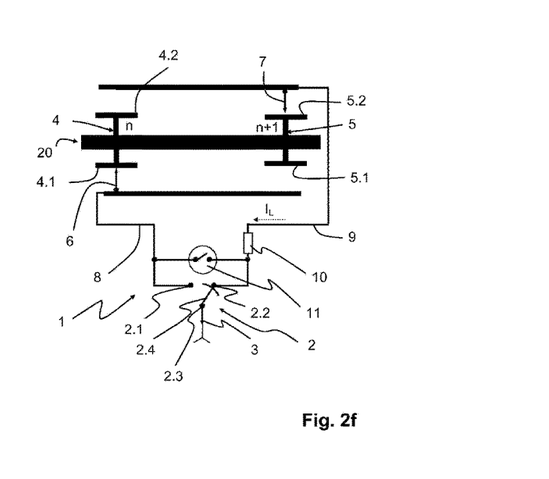
Figure 2G:
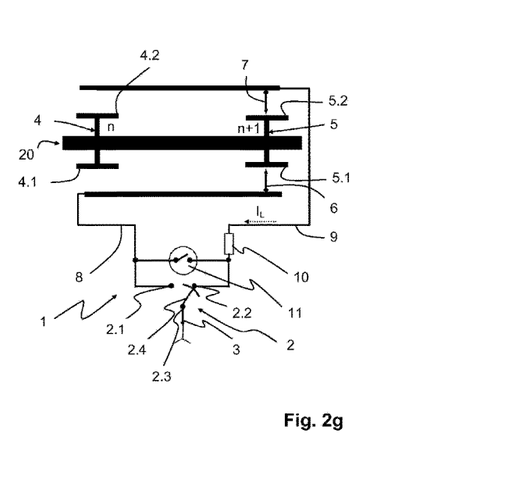

In a step f the switching element 11 is opened and the auxiliary branch 9 is separated from the main branch 8 by the switching element 11, as is illustrated in FIG. 2f. Here, the circular current lk is interrupted. The load current IL now flows from the winding tap n+1 via the auxiliary branch 9, thus via fixed contact 5 and the movable contact 7, to the changeover switch 2 and thus to the load output line 3.

In a step g the first movable contact 6 is separated from the first fixed contact 4 and contacted by the second fixed contact 5, as is illustrated in FIG. 2d.

Figure 2H:
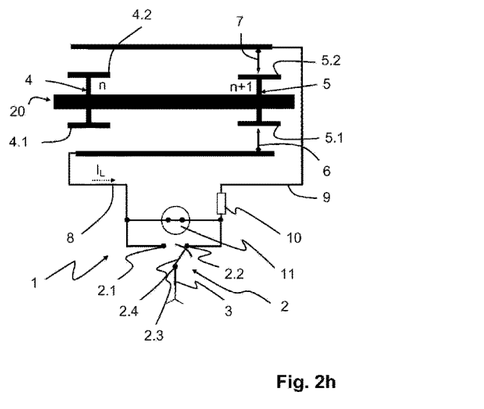

In a step h the switching element 11 is closed and the auxiliary branch 9 is connected with the main branch 8 via the switching element 11, as is illustrated in FIG. 2h.

The load current IL now flows from the winding tap n+1 via the main branch 8, thus via fixed contact 5 and the movable contact 6, by the switching element 11 to the changeover switch 2 and thus to the load output line 3.

Figure 2I:
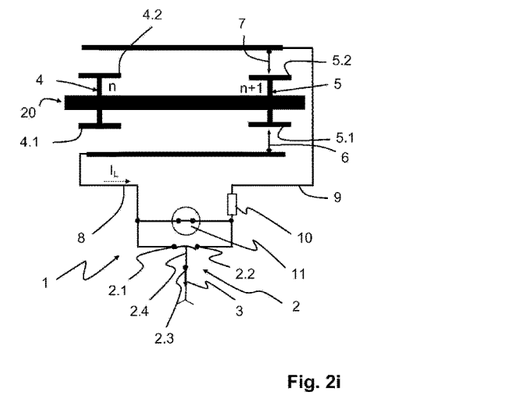

In a step i the load changeover switch 2 is switched into the bridging position, as is illustrated in FIG. 2*i*.

Figure 2J:
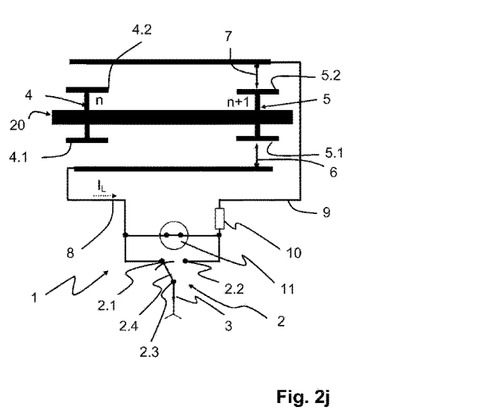

In a step j the changeover switch 2 is switched into the first position, as is illustrated in FIG. 2*j*. The load current IL now flows from the winding tap n+1 via the main branch 8, thus via the fixed contact 5 and the movable contact 6, to the changeover switch 2 and thus to the load output line 3.

Figure 2K:
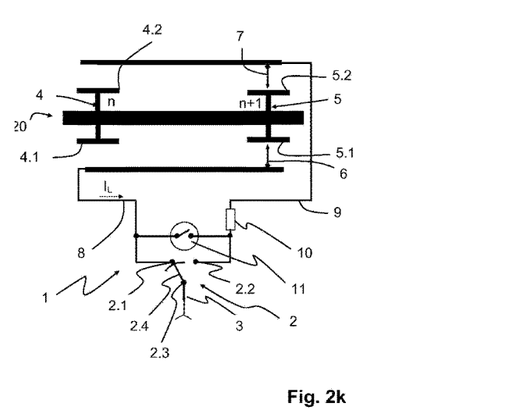

In a step k that follows after step j, the switching element 11 is opened.

Since the switching element 11 is preferably constructed as a vacuum interrupter, it is advantageous that this is closed in the stationary state. In order to hold a vacuum interrupter open an appropriate holding-open force has to be applied. If the vacuum interrupter is closed in the stationary state it is ensured that the actuating mechanism of the vacuum interrupter is not mechanically loaded.

Figure 3A:
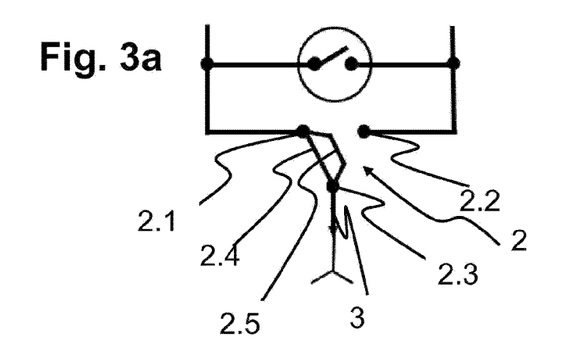
FIGS. 3a-c show a switching sequence of a changeover switch with a second middle contact.
Figure 3B:
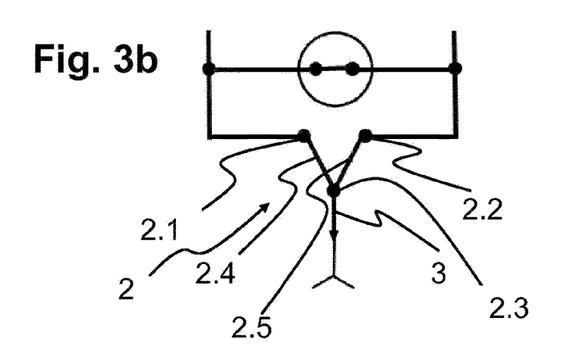
Figure 3C:
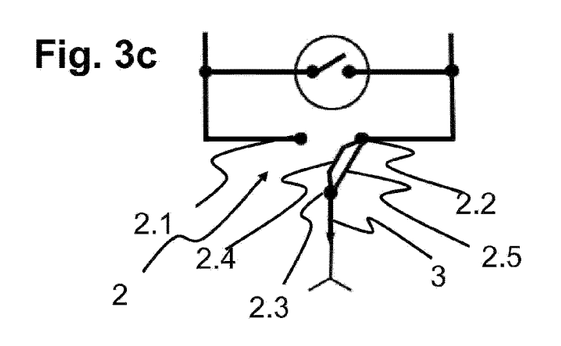

In FIGS. 3*a* to 3*c* a changeover switch 2 constructed in accordance with a second embodiment is schematically illustrated. In this embodiment the changeover switch 2 has two movable middle contacts 2.4, 2.5 that are connected with the third changeover contact 2.3. In that case, the bridging position, as illustrated in FIG. 3*b*, is achieved in that the first middle contact 2.4 contacts the first changeover contact 2.1 and the second middle contact 2.5 contacts the second changeover contact 2.2.

The invention claimed is:

1. An on-load tap changer for uninterrupted switching between winding taps of a control winding, comprising
   a changeover switch that has a first changeover contact, a second changeover contact and a third changeover contact and that can assume a first position in which the first and third changeover contacts are connected to each other, a second position in which the second and third changeover contacts are connected to each other, and a bridging position in which the first, second, and third changeover contacts are connected to one another;
   a first fixed contact that can be connected with an associated first winding tap;
   a second fixed contact that can be connected with an associated second winding tap;
   a first movable contact that can selectably contact each of the fixed contacts
   a second movable contact that can selectably contact each of the fixed contacts;
   a main branch that connects the first movable contact with the first changeover contact;
   an auxiliary branch that connects the second movable contact with the second changeover contact by a current-limiting resistor or varistor; and
   a switching element connected between the main branch and the second changeover contact.

2. The on-load tap changer according to claim 1, wherein
   the changeover switch is formed as a bridging changeover switch and has a movable first middle contact connected with the third changeover contact; and
   in the first position the middle contact contacts only the first changeover contact, in the second position the middle contact contacts only the second changeover contact and in the bridging position the middle contact contacts both the first and second changeover contacts.

3. The on-load tap changer according to claim 1, wherein the changeover switch has a movable first middle contact connected with the third changeover contact and a movable second middle contact connected with the third changeover contact; and
   in the first position the first and/or second middle contact contacts the first changeover contact, in the second position the second and/or first middle contact contacts the second changeover contact and in the bridging position the first middle contact contacts the first changeover contact and the second middle contact contacts the second changeover contact.

4. The on-load tap changer according to claim 1, wherein
   each fixed contact has two contact surfaces; and
   at each fixed contact the first contact surface is associated with the first movable contact and the second contact surface is associated with the second movable contact.

5. A method of actuating an on-load tap changer that has a first and a second movable contact and a first and a second fixed contact and that is constructed in accordance with claim 1, the method comprising the step of:
   switching from a first stationary state in which the movable contacts contact the first fixed contact to a second stationary state in which the movable contacts contact the second fixed contact.

6. The method according to claim 5, further comprising the steps of sequentially:
   when the second movable contact is spaced from the first fixed contact and is contacted by the second fixed contact, switching a load current from a main branch to an auxiliary branch; and
   thereafter separating the first movable contact from the first fixed contact and is contacted by the second fixed contact.

7. The method according to claim 5, further comprising the steps of sequentially:
   separating the first movable contact from the first fixed contact and then bringing the first movable contact into electrical contact with the second fixed contact;
   switching a load current from an auxiliary branch to a main branch; and
   separating the second movable contact from the first fixed contact and thereafter bringing the second movable contact into electrical contact with the second fixed contact.

8. The method according to claim 7, wherein
   switching of the load current is carried out by a changeover switch and a switching element
   the changeover switch is actuated only when the switching element is closed.

9. The method according to claim 8, wherein
   the load changeover switch has a first changeover contact, a second changeover contact and a third changeover contact and can assume a first position in which the first and third changeover contacts are connected, a second position in which the second and third changeover contacts are connected and a bridging position in which the changeover contacts are connected, the method further comprising the steps of:
   prior to movement of the first movable contact opening the switching element and setting the changeover switch in the second position or,
   prior to movement of the second movable contact, opening the switching element and setting the changeover switch in the first position.

10. The method according to claim 5, further comprising the steps of sequentially:
    a) opening or holding open the switching element or and setting the changeover switch in the first position;

b) separating the second movable contact from the first fixed contact and electrically contacting the second movable contact with the second fixed contact;
c) closing the switching element and connecting the auxiliary branch connecting the second movable contact with the second changeover contact through the current-limiting resistor or varistor through the switching element with the main branch that connects the first movable contact with the first changeover contact;
d) switching the changeover switch to the bridging position;
e) switching the changeover switch to the second position;
f) opening the switching element and separating the auxiliary branch from the main branch by the switching element;
g) separating the first movable contact from the first fixed contact and contacting the first movable contact with the second fixed contact;
h) closing the switching element and connecting the auxiliary branch with the main branch through the switching element;
i) switching the changeover switch to the bridging position; and
j) switching the changeover switch to the first position.

11. The method according to claim 10, further comprising the step of,
k) after step j, opening the switching element.

12. An electrical installation comprising
a control winding; and
an on-load tap changer connected with the control winding and constructed in accordance with claim 1.

13. The on-load tap changer according to claim 1, wherein the main branch connects the first movable contact with the first changeover contact without any current-limiting resistor or varistor.

* * * * *